United States Patent
Das et al.

(10) Patent No.: US 9,842,624 B2
(45) Date of Patent: Dec. 12, 2017

(54) MULTIPLE CAMERA VIDEO IMAGE STITCHING BY PLACING SEAMS FOR SCENE OBJECTS

(71) Applicant: INTEL CORPORATION, Santa Clara, CA (US)

(72) Inventors: Barnan Das, San Jose, CA (US); Stanley Baran, El Dorado Hills, CA (US); Richmond Hicks, Aloha, OR (US); Sean Pyo, Yangchun-gu (KR); Kanghee Lee, Gwangjin-gu (KR)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/939,865

(22) Filed: Nov. 12, 2015

(65) Prior Publication Data
US 2017/0140791 A1    May 18, 2017

(51) Int. Cl.
H04N 7/14 (2006.01)
G11B 27/036 (2006.01)
H04N 5/247 (2006.01)
G06T 7/00 (2017.01)
G06K 9/46 (2006.01)
G06T 11/60 (2006.01)
G06K 9/00 (2006.01)
G06K 9/52 (2006.01)
H04N 7/15 (2006.01)

(52) U.S. Cl.
CPC ........ *G11B 27/036* (2013.01); *G06K 9/00442* (2013.01); *G06K 9/4604* (2013.01); *G06K 9/52* (2013.01); *G06T 7/0042* (2013.01); *G06T 7/0085* (2013.01); *G06T 11/60* (2013.01); *H04N 5/247* (2013.01); *H04N 7/15* (2013.01); *G06T 2207/20221* (2013.01)

(58) Field of Classification Search
CPC ........................................................ H04N 7/14
USPC .......................................... 348/14.01–14.09
See application file for complete search history.

(56) References Cited

U.S. PATENT DOCUMENTS

| | | | | |
|---|---|---|---|---|
| 8,547,437 B2* | 10/2013 | Buehler | ............. | G06K 9/00335 348/143 |
| 8,791,984 B2* | 7/2014 | Jones | ............... | G08B 13/19641 348/36 |
| 2002/0122113 A1* | 9/2002 | Foote | ..................... | G06T 3/4038 348/48 |
| 2004/0027451 A1* | 2/2004 | Baker | .................. | H04N 5/2259 348/46 |
| 2007/0092245 A1* | 4/2007 | Bazakos | ............ | G06K 9/00255 396/427 |
| 2010/0315481 A1* | 12/2010 | Wijngaarden | .......... | H04N 7/142 348/14.07 |

* cited by examiner

*Primary Examiner* — Maria El-Zoobi
(74) *Attorney, Agent, or Firm* — Blakely, Sokoloff, Taylor & Zafman LLP

(57) ABSTRACT

Image stitching is described for multiple camera video by placing seams for objects in the scene. An object of interest is identified within an overlap between two images each from a different adjacent camera of a multiple camera system. An identified object of interest is placed within an identified one of the two images. A seam is placed between the two images so that the object of interest is within the identified image and not within the other of the two images. The two images are joined at the placed seam and the two joined images are rendered as a single image joined at the placed seam.

19 Claims, 7 Drawing Sheets

MULTIPLE CAMERA VIDEO IMAGE STITCHING BY PLACING SEAMS FOR SCENE OBJECTS

FIELD

The present invention relates to multiple camera video image stitching and in particular to placing the positions of seams between images.

BACKGROUND

With the emergence of low cost high definition video cameras and high speed internet connectivity, video internet traffic is growing quickly. 360 degree video is an emerging trend in video conferencing, automotive, and surveillance applications, among others and is supported by wide field of view cameras, including 180 and 360 degree field of view cameras. Dedicated web sites and channels are also available to post and view 360 degree videos. For collaboration between groups of users, 360 degree video offers greater flexibility. Instead of switching between cameras, a remote viewer can move across a room using a 360 degree view and zoom in on people or objects of interest in the camera's view.

To support 180 and 360 degree video capture, the imaging system requires a wide Field of View (FoV). This allows more of the scene to be captured simultaneously. A common method of increasing the FoV is to use multiple cameras all pointing out from different directions so that the combination of cameras covers the desired FoV. In such a multiple camera system, the edge of one camera's FoV meets or overlaps with the edge of the next camera's FoV. With enough cameras, a complete circle or half circle is obtained. Such a system suffers a discontinuity in the image in the overlapping regions between each pair of adjacent cameras.

The seams can be avoided or at least reduced by using a single camera with a 360 degree FoV or reduced by using fewer cameras with higher individual FoVs. The single camera avoids the multiple camera inputs and the stitching. In practice, however, a large higher resolution single image sensor with a correspondingly large wide angle imaging optics system is more expensive than a multiple camera system with standard or medium wide angle lenses. At similar cost, the single camera system is limited by the resolution of the single imager and perhaps by distortion produced by the lens system.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
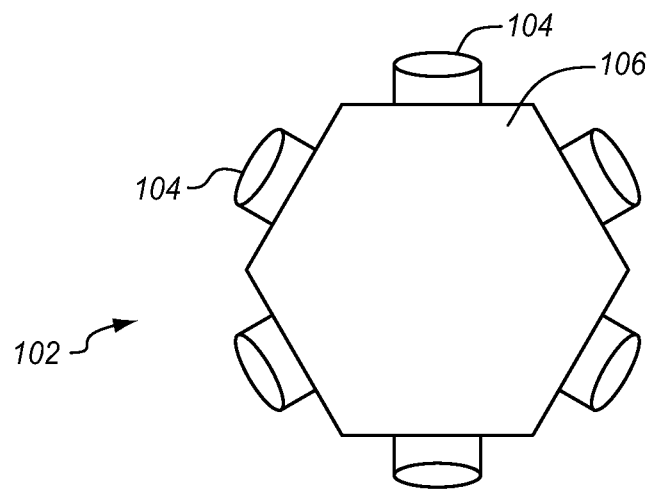
FIG. 1 is a top view diagram of a multiple camera panoramic array according to an embodiment.

In a multiple camera video system, there are two primary causes of dissatisfaction in the seams. When images from two different cameras are combined, to present a wider perspective, then there will be a seam between the image from the first and the image from the second. First, the two different images on either side of a seam each come from a different camera. There may be differences in precise camera position, differences in light exposure settings, and differences in color or white balance. This can cause a difference between the two cameras in how a single imaged object appears.

Second, the two cameras that provide the image on either side of a seam are in different positions. There is a difference in how the same imaged object appears from the point of view of each of the two cameras due to parallax. In brief, because the adjacent cameras are in different physical positions, the same object will be seen from a different point of view by each camera. This causes a discontinuity when a seam is across the object.

There are many different ways to compensate for these artifacts and discontinuities using digital image processing. However, the more effective approaches require significant processing resources. In the case of parallax, the images contain different information because of the difference in what each camera sees from its position. The missing information cannot be provided by any amount of processing.

As described herein, to avoid the distraction of visual artifacts along the seams, the seams are moved away from regions of interest in the scene, such as users' faces, text regions, etc. These regions are first detected. The seams of the multiple camera system are then moved to avoid these regions.

In one example, the camera hardware is mechanically rotated about the wide FoV, typically the vertical) axis, so that the seams do not fall (or have minimum overlap) on the regions of interest. The amount of rotation of the camera hardware may be optimized for cases of multiple regions of interest.

In a second example, the views of the cameras that are stitched together overlap. There is an overlap between each camera in the right edge of one camera's image and the left edge of the adjacent camera's image. In these overlap areas, the images are the same except for parallax and other effects as noted above. When the images are stitched together, the seam may be placed anywhere within the overlapping fields of view. A seam finding technique, restricted to the overlapping region, is used to find a seam that minimizes overlap of the seam with a region of interest. This allows each seam to be placed differently from each other seam to provide a better placement for each seam. This also avoids physically rotating the camera hardware. On the other hand, it makes less efficient use of the cameras because of the overlap. The larger the overlap, the better the choices for seam placement. The digital seam movement may be combined with rotating the cameras to provide more flexibility.

Unpleasant and distracting visual artifacts may be avoided along seams between cameras either by physically rotating the camera, or restricting a search space of a seam finding algorithm, so that the seams do not fall on important regions of the scene or both. Accordingly, the high resolution of a final stitched image from multiple outwardly-pointing cameras is maintained without using computationally expensive techniques for parallax minimization and image blending.

FIG. 1 is a top view diagram of a panoramic camera system 102 suitable for use as a part of the systems described herein. An array of cameras 104 is attached to a support 106. In this example, there are six identical cameras each equally spaced around the perimeter and facing outwards from the center of the support in a different direction to provide 360° coverage or a 360° combined field of view. Each camera is responsible for a 60° horizontal angle of view. The cameras may be configured to each have a 60° horizontal field of view in order to minimize overlap. The cameras each capture a different adjacent 60° view of the scene. Alternatively in another embodiment, the cameras overlap each other by some amount. As an example, each camera may have a 90° field of view to provide 15° of overlap on each side of the image. More or fewer cameras may be used with corresponding adjustments in the field of view and in any overlap. More overlap allows for more flexibility in adjusting seams, but requires more pixels to be processed without improving the number of pixels of the final image. The vertical field of view may be selected based on the intended application.

The camera array may be modified in many different ways. As an example, more cameras may be used so that each camera is responsible for a narrower field of view. With nine cameras, for example, each camera covers only a 40° horizontal field of view. The cameras may differ. A front may be identified in the array and the front cameras may have a higher resolution, closer spacing or some other enhancement as compared to side and rear cameras. Alternatively, the field of view may be narrowed to 180° using three cameras or some other amount using any desired number of cameras. As another alternative additional cameras may be mounted above or below or both above and below the illustrated array in order to image the scene that is above or below the field of view of the illustrated camera array. The additional cameras may be used to increase the vertical field of view of the array.

In some embodiments, the cameras have a fixed field of view and a fixed focus distance. The focus distance and depth of field may be selected to suit a particular implementation. In other embodiments, the cameras each have an autofocus mechanism to each set a focus distance based on objects which appear in each camera's respective field of view. In some embodiments, one or more of the cameras is able to zoom or adjust its field of view or focal length. This allows the camera to zoom in on a particular subject. This also creates a blank area in the seam between the zoomed camera and the adjacent cameras. As a result, a digital zoom may be preferred for many uses and an optical zoom may be reserved for special uses and situations.

The cameras may also each have an independent automatic exposure system and color balance compensation system. This may be used so that each camera operates to match exposure and color balance to a particular intended common result. Alternatively, the cameras may be controlled by a module in the controller to minimize differences between the cameras or to match the appearance of the scene across different cameras.

Figure 2:
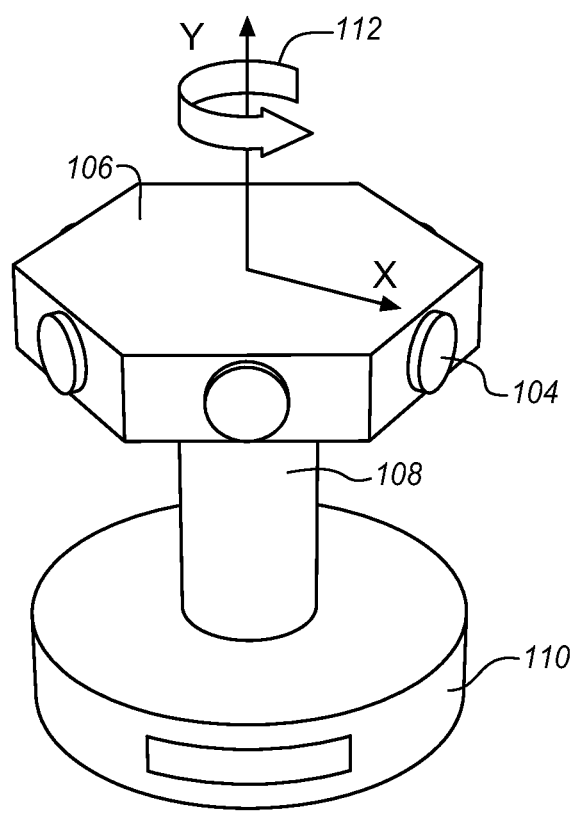
FIG. 2 is an isometric view diagram of the multiple camera panoramic array of FIG. 1 according to an embodiment.

FIG. 2 is a side view diagram of the camera system 102 of FIG. 1 showing the cameras 104 attached to the support 108 which is connected through a mounting shaft 108 to a control housing 110. The control housing may be used to house power supplies, sensors, controllers, processors, and stabilization systems. In some embodiments, the control housing includes a motor, for example a servo motor or a stepping motor, to rotate the camera support 106 about the vertical (y) axis as shown by the arrow 112. The stepping motor may be controlled by one or more processors to move the seams between the cameras. This allows the seams to be placed at better locations in the scene. With this structure, the seams are all moved along the horizontal (x) axis at the same time. In some embodiments, the control housing includes mounting points to allow the system to be attached to a mobile or portable fixture for use.

Figure 3:
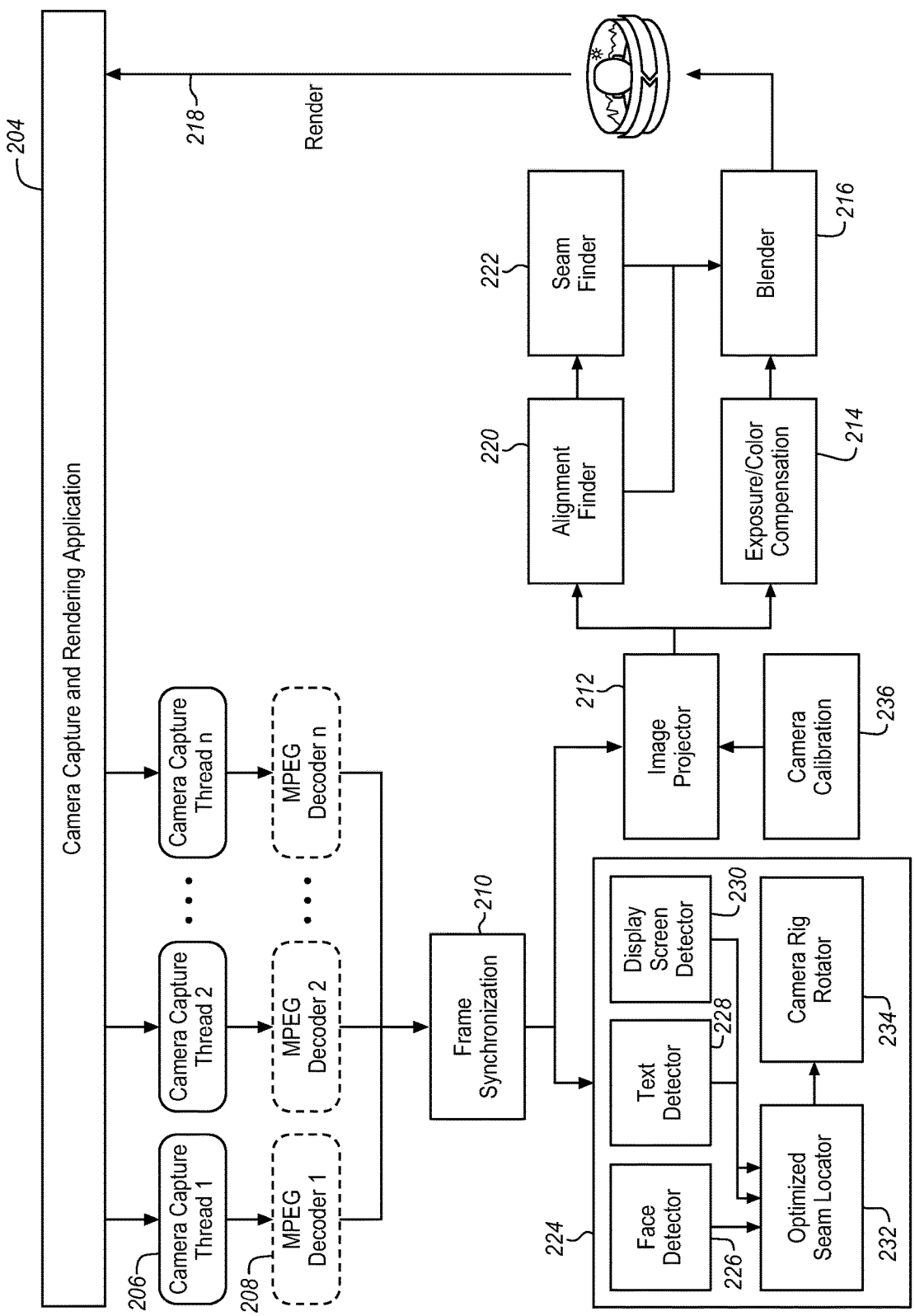
FIG. 3 is a block diagram of a system for operating the multiple camera panoramic array of FIG. 1 according to an embodiment.

FIG. 3 is a block diagram of a system for operating the camera system of FIG. 2. The multi-camera video stitching pipeline may be implemented on a variety of different hardware systems. GPUs (Graphics Processing Units) may be used to accelerate operations using any of a variety of media development framework or other types of graphics, media, or video frameworks. As described herein, visual artifacts may be reduced on the seams between any two adjacent camera views.

In the example of FIG. 3, the controller determines how to align the seams and then rotates the camera support to place the seams in the desired location. This physical rotation system uses a motor and does not require any significant overlap between the views of each camera. These operations may be combined with the seam adjustment operations described in the context of FIG. 4. The primary control is through a camera capture and rendering application 204. The cameras are each coupled to this application so that there is a camera capture thread 206 from each camera. While six cameras are shown in FIG. 1, any other desired number may be used. If the camera outputs are compressed or encoded, then the camera capture threads are optionally applied to a decoder 208 for each camera and the decoded threads are applied to a synchronization module 210 to align frames from each thread. If the camera outputs are not compressed or if the described processes may be performed on encoded or compressed video, then the decoders are not used.

In the illustrated example, the synchronization and many other functions are performed at the application 204 level, however, the synchronization 210, image projection and other functions may be performed by hardware in the camera system or at some other level. In addition, the decoding of the video frames may be skipped if the video cameras provide uncompressed frames or if the seam placement may be performed using compressed video.

The synchronized frames are provided as an input to an image projector 212 which arranges the frames of the camera capture threads based on the position of the cameras and projects the arranged frames into a suitable projection surface for the intended presentation. In some embodiments, a panoramic view is projected onto a cylindrical surface. For other embodiments, the projection surface may be planar, spherical, fisheye, stereographic, Panini, Mercator or another type of projection. This is an optional operation but it allows the rendered view to appear as if it was produced from a single seamless imager. The image projection may be performed in any of a variety of different ways and converts the original multiple separate image planes from each camera into a single shared image that is cylindrical or in some other configuration, depending on the nature of the projection. The image projection may also vertically align the images. The vertical alignment may be performed together with the seam placement. The image projector may also digitally compensate for any distortion or misalignment of the individual cameras required to map them into a common image space. These operations may include rectification.

In one example, the frames are first projected onto a cylindrical surface using, for example, a scan-line algorithm and backward 3D coordinate projection. The distortion coefficients obtained from calibration 236 may be used at this time to fix any distortion caused by the camera lenses. For cameras with overlapping fields of view, the alignment between each pair of overlapping frames may be determined. This may be done by finding the translation offsets between the frames in horizontal and vertical axes. As an example, histograms of oriented gradient (HOG) features in two frames may be found and matched using a brute force search.

The image projection may be aided by a intrinsic camera parameters from calibration 236. The calibration parameters may be used to compensate for minor misregistration of the cameras due to variations in the support 106 or in the cameras, for example. The camera calibration may also take other factors into account such as differences in the optical system such as focal lengths, principle points, and distortion coefficients. Image sensor differences may also be taken into account, such as misalignments, bad pixels, light sensitivity, and other variations.

The image projection is applied to any of a variety of different graphics and video enhancement and smoothing effects. In this example, exposure and color compensation 214 is used to match the frames from different cameras to each other and alpha blending 216 is used to blend the seams between adjacent cameras more smoothly. The resulting render 218 is provided back to the rendering application to present on a suitable display. These operations are provided as examples. There may be variations and modification to support different types of rendering and projections and different types of camera and control systems.

The rendering engine or player 204 may be configured to provide a full panorama and to allow the user to manipulate the source and destination rectangles to get any desired view with panning and zooming. The output of the stitching pipeline is a very wide aspect ratio (about 9:1 in the described example) rectangular video surface. Thus, the rendering engine may be a very wide image. With the camera sensor of FIG. 1, the image will be six times wider than the image from any one camera. The view may be zoomed in any particular place in the panorama by shrinking the source rectangle while maintaining the full destination rectangle. A user interface may be provided that allows for panning and zooming using a touchpad, mouse, touchscreen or any other desired interface. While 360° views are shown in some examples, other wide angle views may be used instead using 2, 3, 4 or more cameras.

In addition to the primary pipeline to render the multiple camera views into an appropriate image projection, additional modules consider the seams so that the camera support may be rotated when appropriate. A seam movement system 224, analyzes the received camera capture threads and, in particular, the edges of the frames in the threads. A face detector 226 finds faces in the frames of the camera capture threads. A text detector 228 finds text in the frames of the camera capture threads. A display screen detector 230 finds display screens, white boards, easel boards and other displays in the frames of the camera capture threads. These are provided only as examples. There may be other types of detectors to find other objects in the frames of the camera capture threads. Each of these detections is provided to a seam locator 232. The seam locator then sends a signal to a camera rig rotator 234 to rotate the camera support 106.

The seam movement system finds objects that are important to the scene. These are the objects that should not extend across a seam. Using the seam locator, the system then tries to find a camera support rotation angle that will move the seams away from these objects. The camera may then be rotated about the y-axis to adjust the horizontal positions of the cameras. If it is not possible for all such objects to be outside of the seams, then an optimization or cost function may be used to find a rotational position for which the most important items or the largest number of such items are not in a seam.

To initialize the camera system, the camera intrinsic and extrinsic parameters are determined from calibration. These intrinsic parameters are then provided to a block 236 that is used to generate the image projection. In addition, the alignment of each of the cameras is determined 220 and the seams are determined 222. This allows the positions and order of the cameras and the positions of the seams between each camera to be identified. This information is used in the blending 216, such as alpha blending, so that the appropriate images are aligned properly and are blended with the appropriate other images for the configuration and ordering of the cameras.

In the illustrated system, there are alignment 220 and calibration 222, 236 functions that are performed at initialization and at intervals during use. In some cases, these may be performed once after the system is assembled and never again. On the other hand, there are other functions such as detecting regions of interest 226, 228, 230, compensating for exposure and color differences 214 and blending the seams between frames 216 that are performed every frame or almost every frame. The system may determine the amount of movement of the camera and objects of interest and determine how often to perform such operations.

Figure 4:
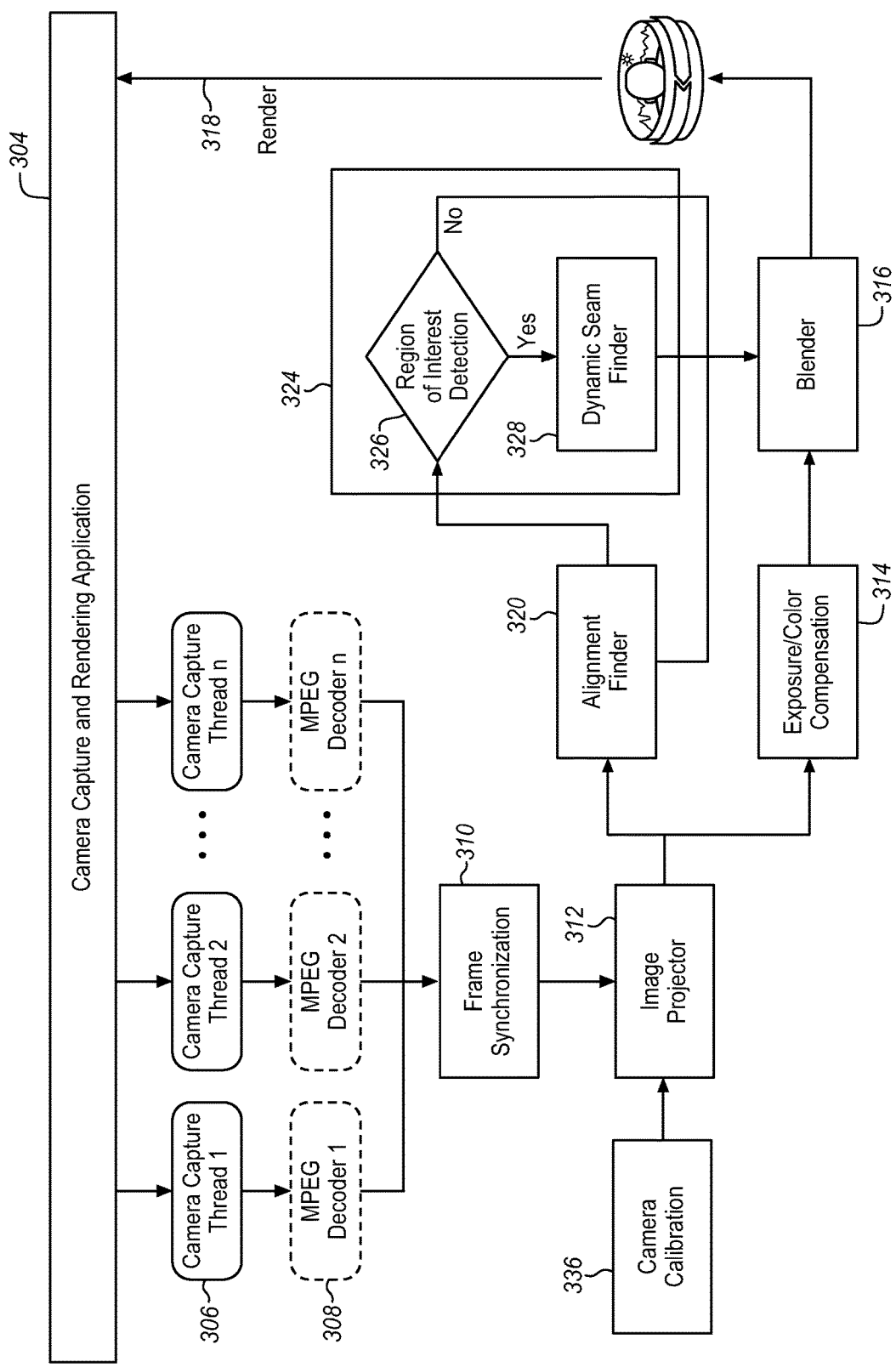
FIG. 4 is a block diagram of an alternative system for operating the multiple camera panoramic array of FIG. 1 according to an embodiment.

FIG. 4 shows an alternative camera control system. In this system, the camera fields of view overlap and the seams are adjusted digitally, not mechanically. This has the benefit that two different seams may be moved in opposite directions and no motor is required. This cannot be done when the cameras are attached to one support and the support is moved as one piece. On the other hand, additional pixels must be provided by the cameras and processed by the system in order to accommodate overlapping fields of view.

The sequence of frames from each camera is received in a camera capture and rendering application 304. Each video sequence is provided as a camera capture thread 306 to a respective optional decoder 308. The capture or decoder outputs are provided to a synchronization module 310 to synchronize the frames as they arrive from each camera. The synchronized frames are fed to an image projector 312 to generate the projection for viewing the images. Intrinsic camera parameters 336 are provided from the camera calibration to improve the accuracy of the projection. The calibration, like finding alignment 320 may be occasional or once only functions.

The projection is provided to exposure and color compensation 314 and blending 316, such as alpha blending to produce the rendered panoramic view 318 that is provided back to the rendering application. This view is then shown to a viewer and transmitted to other nodes for storage, viewing, or analysis as desired.

A seam adjustment system 324 receives the camera alignment 320 that was performed to initialize the system. It also receives the image projection and analyzes the overlapping areas. As mentioned above, the seams all include some overlap so that each seam may be moved left or right to avoid any important objects. The seams may also be shaped to curve around objects in the scene. Within the seam adjustment system a region of interest (ROI) detector 326 finds regions of interest. If any ROIs are found, then they are provided to a dynamic seam finder 328 to determine whether they occur on seams. The dynamic seam finder then adjusts the seams to move the seams away from the ROIs. The seam adjustments are provided to the blender 316 which then blends the frames from each camera together using the seam information so that the seams are placed as determined by the dynamic seam finder.

The ROI detection may be the same or similar to the face detector 226, text detector 228, and display screen detector 230 of FIG. 3. Either system may be configured to detect the objects and regions that are expected to be of most interest to the user. These objects are particularly important for many video conference applications, but other objects may be more important for other applications. As an example, for a mapping application, buildings and identification plates or signs may be more important than faces. As another example, cars and pedestrians may be more important for an automotive application.

Figure 5:
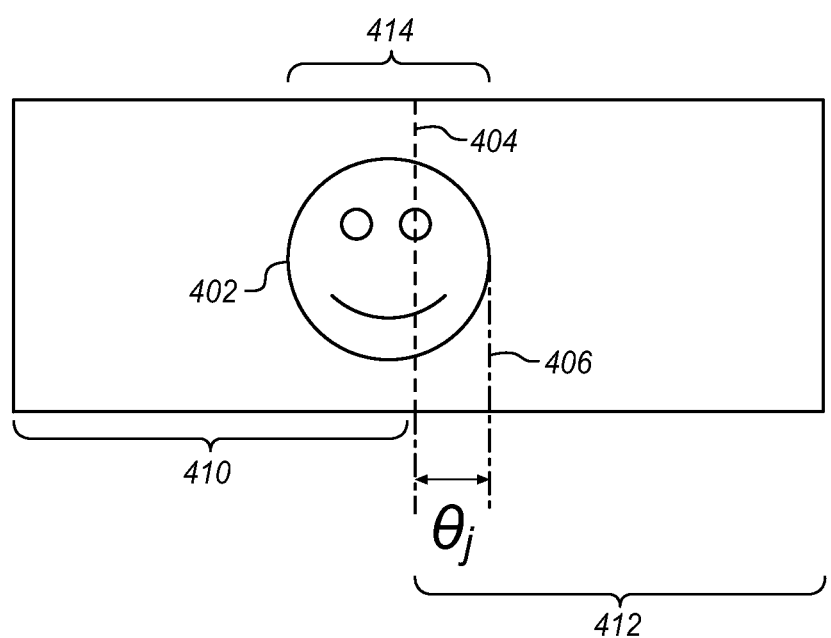
FIG. 5 is a diagram of two overlapping images from nearby cameras showing seam placement dimensions between the two images according to an embodiment.

FIG. 5 shows an example of a detected face 402 that appears in frames from two adjacent cameras. The face appears in a left side frame 410 from one camera and in a right side frame 412 from an adjacent camera. The seam 404 between the two frames passes through the face. This may cause distracting artifacts to a viewer who is observing the face as it is rendered by the camera system and the rendering application. As shown, by moving the seam by an amount indicated as $\theta_j$ the face is shown clearly and fully in the left side frame 410. Alternatively, the seam may be moved a greater distance in the opposite direction to place the face fully in the right side frame 412. The new seam position 406 may be caused by rotating the camera support about a vertical axis by $\theta_j$ or by digitally moving the seam. If the two frames overlap in an overlap area 414 of the two frames, then the seam may be moved to the left or right to avoid any object of interest. In this case, the seam may be moved from the center position 404 to the right to a new position 406 by using more of the left side image and less of the right side image. As a second example, the seam may be shaped to follow the silhouette of the face further hiding the seam in a naturally occurring edge.

One useful application of the camera system of FIG. 2 is with a video conferencing node for immersive video conferencing in conference rooms. The camera system 102 may be placed on a table or mounted from the ceiling in the middle of the conference room to provide a clear view of all of the conference room participants. In such an application, some of the regions of interest to be avoided may include human faces, text on a white board, display screens, such as projection screens, computer monitors, televisions, etc. The seam locator may then respond to detecting these items by moving the seams mechanically or digitally.

Figure 6:
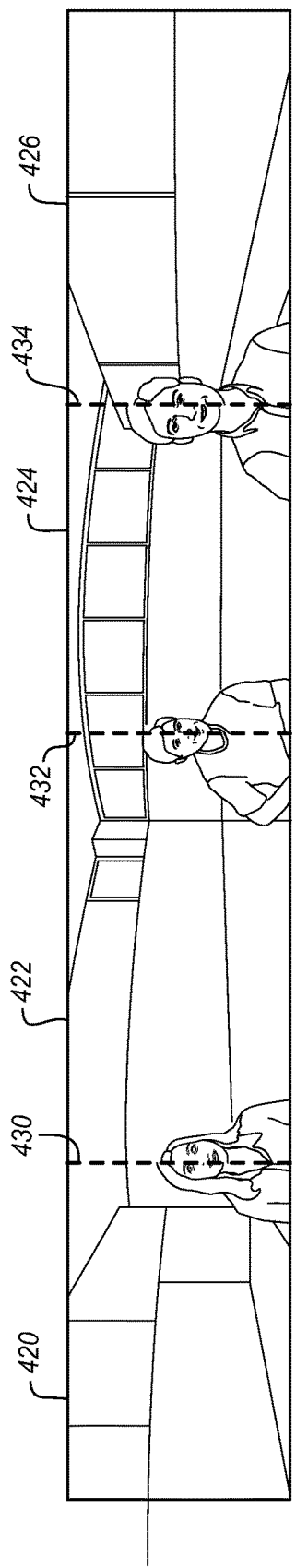
FIG. 6 is a diagram of four horizontally aligned images from a camera array showing seam placement according to an embodiment.
Figure 7:
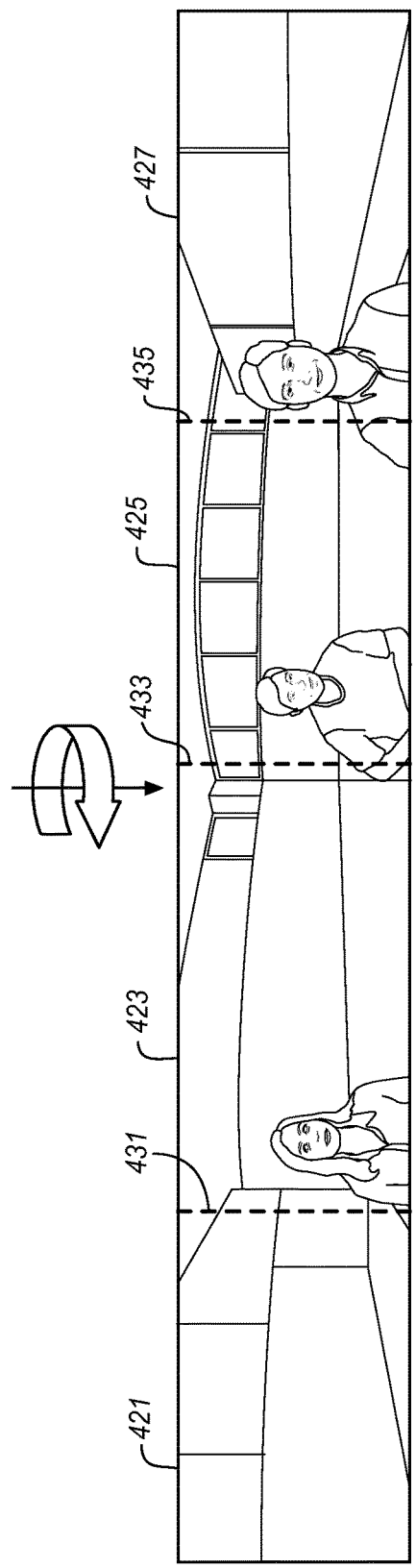
FIG. 7 is a diagram of four horizontally aligned images from a camera array similar to that of FIG. 6 showing an alternative seam placement according to an embodiment.

FIGS. 6 and 7 provide another example of seam adjustment. FIG. 6 shows example frames 420, 422, 424, 426 from four adjacent cameras. There are seams 430, 432, 434 between each frame. In this example, the four images do not provide a full panoramic view of the room. For a full 360° system more cameras, for example 2 or 4, may be used to capture the rest of the conference room or four cameras with a wider field of view may be used. In this example, all three seams are each directly over a person in the conference room.

FIG. 7 shows the same scene after the camera support has been rotated to the left. This moves all of the seams to the left so that each person is now fully within a single frame from a single camera. In FIG. 7, there are four frames 421, 423, 425, 427 that are again from the four adjacent cameras with seams 431, 433, 435 between each frame. The conference participants are much more pleasant to view without the distracting seams.

Figure 8:
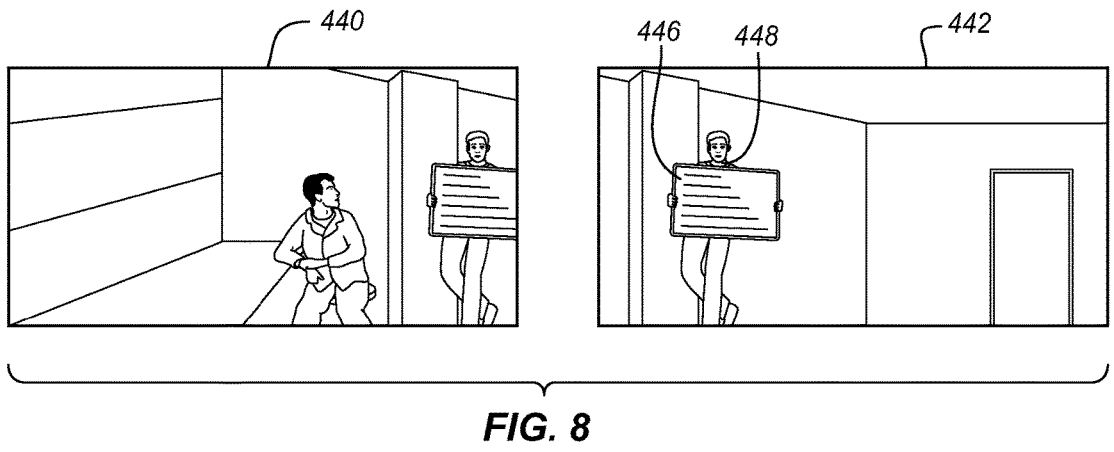
FIG. 8 is a diagram of two horizontally aligned overlapping images from a camera array according to an embodiment.

FIG. 8 shows another conference room to show how a digital seam adjustment may be used to advantage to enhance a video conference experience for a remote viewer. Two video frames 440, 442 from two different cameras are shown. More frames may be used to suit different applications. The conference is not being held in a room constructed specifically for use as a conference room but in a laboratory or work room environment. The left side frame 440 includes a first person who is participating in the conference and a second person 448 who is also participating. The second person is holding a whiteboard 448 in order to show the whiteboard to participants at other video nodes. The right side frame 442 also includes the second person 446 and the whiteboard 448. The second person and the whiteboard are provided as examples. The second person may be holding or presenting any item for the remote participants. Alternatively, the second person may be holding nothing at all or the item may be presented on a stand, table, or other fixture.

As shown, the two frames overlap 460 in their field of view. The second person appears entirely within this overlap. The whiteboard is almost entirely in the left side frame and is entirely within the right side frame. In order to move any seams, the detector modules first identify any objects or regions of interest in any of the frames. The first person may be detected with a face detection or human detection module. Since the first person is entirely within the left side frame, the system marks this object as an object of interest and endeavors to keep the first person fully within the left side frame. The second person and the whiteboard may be detected by face detection and by a display screen detector. Other detectors may detect these objects of interest in addition to or instead of a face detector and display detector.

Figure 9:
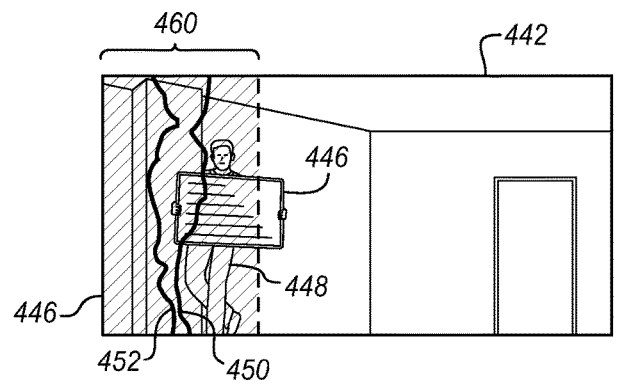
FIG. 9 is a diagram of a selected one of the two images of FIG. 8 showing possible seams on the edge of the selected image according to an embodiment.

FIG. 9 shows operations that may be used to place a seam between the left side and right side frame. FIG. 9 identifies the overlap 460 between the two frames. The seam between the two frames may be digitally placed anywhere within this overlap region. Because the seam is digitally generated, it is not required to be a straight line. The seam may move laterally or horizontally down the frame in order to place some items on one side of the seam and other objects on the other side of the seam. As shown, a first candidate seam 450 is placed to the left of the second person. This seam ensures that the second person 448 is completely within the right side frame. The first candidate seam cuts through the edge of the whiteboard 446. A second candidate seam is to the left of both the whiteboard and the second person. This makes the second person appear more natural and also makes the whiteboard easier to read.

These seams 450, 452 may be established in a variety of different ways. In one example, an original default seam is drawn. This seam may be drawn through the middle or center of the overlap or in any other desired default position. This default seam may then be checked to determine whether it passes through an identified region or object of interest. If the seam is drawn through an object or region of interest, then a seam finder module or another construct may use the boundary of the object or region of interest as a constraint to find a new seam. The first candidate seam shows a seam with the boundary of the second person as a constraint. The second candidate seam shows a seam with the boundary of the second person and the whiteboard as constraints.

Figure 10:
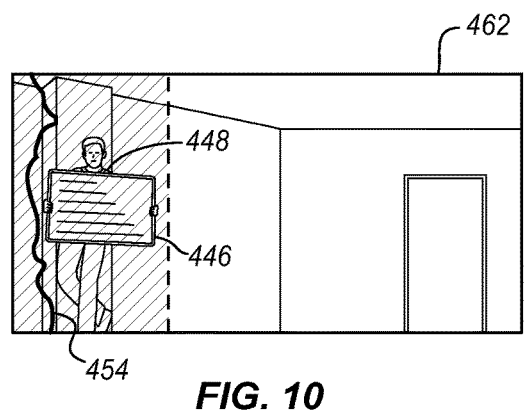
FIG. 10 is a diagram of an image corresponding to the selected image of FIG. 9 after some when during which an object of interest has moved showing another seam placement according to an embodiment.

FIG. 10 shows another right frame 462 in the video sequence after some time. In this case, the second person and the whiteboard have moved to the left. As a result, a new seam 454 is found that avoids the identified regions of interest. This figure is to illustrate that the seams must be re-evaluated as the video frames are captured in order to move the seams. This may be aided by object tracking or by repeating the detection processes or both. While a person may move within the frame as shown in FIG. 10, a person may also leave the conference room and a new person or other object of interest may enter the conference. Accordingly, the detection for faces and other objects of interest may be repeated to determine when someone or something has entered the room.

The ROIs may be adapted to suit different applications. In other applications, the ROIs may include an entire user's body in addition to the face or feature-rich areas, such as areas in the scene with a multiple repetitive patterns. In addition motion detection may be used to track people or other objects. This may be suitable for use with a static scene in which people are moving around.

As mentioned above, seams are found so that the seams do not fall on regions of interest. In the event that this is not possible, then seams are found that minimize or reduce the regions of interest upon which the seams fall. This may be done using optimization techniques such as a gradient descent, among others. For gradient descent, the problem may be expressed in terms of m cameras and n seams. If the final field of view is a horizontal 360°, then m=n. If the final field of view is less than 360°, then m=n-1.

The gradient descent may be expressed in terms of a set of weights w that are assigned to each region of interest based on that region of interests importance and an amount of seam movement θ. For mechanical seam movement θ is the same for each seam. For digital seam movement, a different value of movement θ may be used for each seam. On the other hand, the mechanical seam movement may have a greater range of values. In other words, while a digital seam may only be moved as far as the overlap between the two frames, the mechanical seam may be moved as far as the motor system allows. This may be as much as the entire width of one or more frames.

Each weight may be identified as wj, where j=1, 2, 3 . . . k, where k is the number of identified regions of interest. Weights may be assigned manually or based on an identified category. For example, the whiteboard 446 may be identified as more important than the person 448 holding the whiteboard. The weights may vary based on the particular use to which the camera system is applied. The weights may be normalized as follows:

$$\Sigma_{j=1}^{k} w_j = 1 \tag{Eq. 1}$$

The objective of the optimization or seam location selection operation may be to minimize the cost function:

$$J(w_1\theta_1, w_2\theta_2, w_3\theta_3 \ldots, w_n\theta_k) \tag{Eq. 2}$$

where $\theta_j$ represents the minimum horizontal distance between the seam and either of its edges in the horizontal axis as shown in FIG. 5. The values of the $\theta_j$ coefficients are dependent upon the dimensions of the ROI and therefore may be different for every seam. As an example, $\theta_j$ for a seam passing through a large whiteboard will be greater than $\theta_j$ for another seam passing through a person's face in the same scene. This assumes that the whiteboard is wider in physical dimensions than the face.

θ and w are mutually independent parameters. θ represents the overlap of a seam with a ROI. w represents the importance of the ROI for a particular use-case A gradient descent may be applied to the seam finding or seam adjusting using a sequence of operations. For the servo motor case, the system starts with an initial value for the rotation $\theta_j$. This initial value may be a random or default value or it may be the current value.

The system then selects a new value within the camera system's range of motion and determines the cost function J above.

The system then repeats the selection of a new value and determination of the cost value until the cost function converges to a final result. The convergence may be defined as $$\theta_j := \theta_j - \alpha \frac{\partial}{\partial \theta_j} J(w_1\theta_1, w_2\theta_2, w_3\theta_3 \ldots, w_n\theta_k) \tag{Eq. 3}$$

where α is the learning rate.

Once the optimal seam locations are found, the servo motor may be used to rotate the camera system as suggested, for example, in FIGS. 6 and 7. Alternatively, a similar operation may be performed to find a single digital seam with multiple objects of interest and to move that one seam to best avoid the objects of interest.

As a further alternative, in a digital seam finding system the search space is confined to the overlap area 460 for a single seam. If the seam is found to be on a detected region of interest, then the seam finder operation is triggered. The search space for the seam is restricted to the overlapping region 460 of the camera views 440, 442. The search region is further restricted to the areas outside the detected regions of interest. In other words, the areas that do not include a region of interest are used for the search. In some embodiments, a dynamic programming approach may be used. The seam is then adjusted to so that it does not pass through the regions of interest. The seam may be moved digitally without rotating the camera and without considering the other seams. Alternatively, the seam may be moved by a combination of mechanical and digital mechanisms.

While the described examples are used to place vertical seams between images or frames that are horizontally aligned, the same techniques may also be used to place horizontal seams between frames that are vertically aligned. In the interior scenes shown here as examples, there is little of interest to the viewer above and below the illustrated frames. Most indoor situations and most person-to-person discussions do not provide very much interest on the ceiling or floor. However, for other applications, the scene may have significant details above or below eye level. In such a scenario, additional cameras may be added above and below the main eye level grouping.

Figure 11:
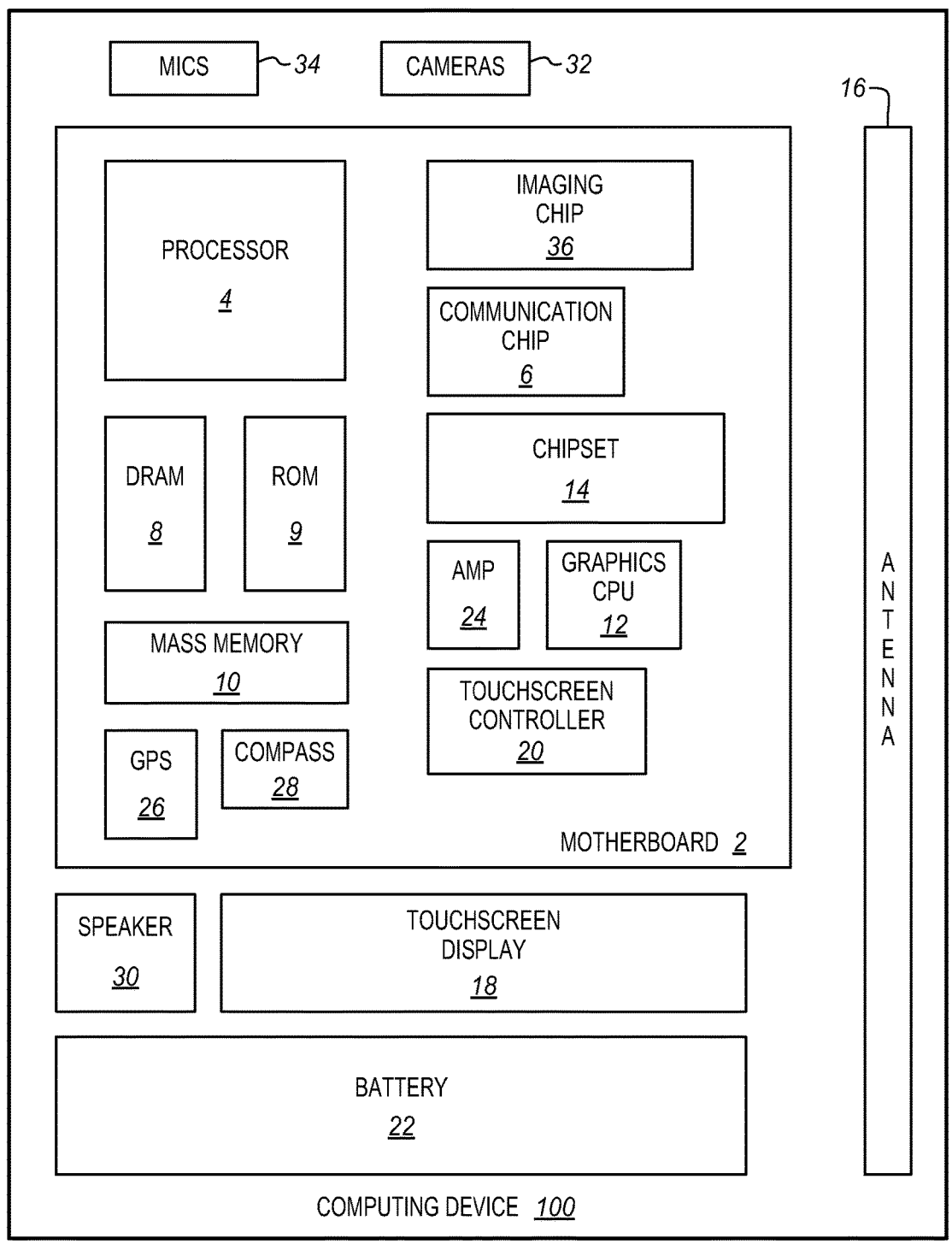
FIG. 11 is a block diagram of a computing device incorporating an image processing system with multiple cameras according to an embodiment.

FIG. 11 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36 and to the processor 4, either directly or through the image chip. The image chip may take a variety of different forms, such as a graphics co-processor, a digital signal processor (DSP), an image signal processor (ISP), or any other type of separate dedicated imaging management module. Such a device or module may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the image processing may be implemented as a standalone chip or integrated circuit, or as circuitry comprised within the processor, within a graphics chip or other integrated circuit or chip, or within a camera module. The techniques described above may be implemented in the image chip of the processor or functions may be distributed between different components which may include the cameras, image chip, processor, and other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

The camera array 32 may be of the type described in reference to FIGS. 1 and 2 or another suitable configuration. The camera array may be incorporated into the same housing as the rest of the computing device 100 or it may be a separate peripheral device attached through a suitable wired or wireless connector. The computing device may be used a conferencing node in a fixed or portable configuration.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes identifying an object of interest within an overlap between two images each from a different adjacent camera of a multiple camera system, the overlap being an image region in which an edge of a field of view of one of the two cameras overlaps an adjacent edge of a field of view of the other of the two cameras so that the overlap is in both of the two images, determining that the identified object of interest is within an identified one of the two images, placing a seam between the two images so that the object of interest is within the identified image and not within the other of the two images, joining the two images at the placed seam, and rendering the two images as a single image joined at the placed seam.

In further embodiments placing the seam comprises searching for a seam position and confining the search to the overlap.

In further embodiments identifying an object of interest comprises identifying one of a face using a face identification module; text using a text identification module, or a display screen using a display screen detector module.

In further embodiments identifying an object of interest comprises tracking a location of a previously identified object of interest.

In further embodiments placing a seam comprises drawing a seam at an initial position, determining whether the drawn seam passes through the object of interest, and using a boundary of the object of interest to move the seam to avoid the boundary.

In further embodiments the boundary is used as a constraint in a seam placement process.

Further embodiments include identifying a second object of interest within the overlap and using a boundary of the second object of interest as a second constraint in the seam placement process.

In further embodiments determining that the identified object of interest is within an identified one of the two images comprises determining that the identified object of interest is entirely within an identified one of the two images.

Some embodiments pertain to a method to minimize or reduce the regions of interest upon which a seam falls that includes identifying regions of interest that occur near seams between images each from a different adjacent camera of a multiple camera system, assigning a weight to each identified region of interest, minimizing a cost function based on a combination of the weight and a displacement of a corresponding seam, placing seams between the two images using the minimized cost, joining the images at the placed seams, and rendering the images as a single image joined at the placed seams.

In further embodiments the weights are assigned based on the importance to a viewer of the respective region of interest.

In further embodiments the weights are assigned based on a category of an object in each respective region of interest.

In further embodiments the cost function is a gradient descent.

In further embodiments minimizing the cost function comprises selecting a series of displacement values and determining a cost until the cost converges.

In further embodiments placing seams comprises rotating a camera support that carries the different adjacent cameras of the multiple camera system.

Some embodiments pertain to a video conference node that includes a system processor, a communication interface coupled to the system processor, and a multiple camera system coupled to the system processor, the multiple camera system capturing at least two images each from a different adjacent camera, the images having an overlap being an image region in which an edge of a field of view of one of the two cameras overlaps an adjacent edge of a field of view of the other of the two cameras so that the overlap is in both of the two images, the system processor identifying an object of interest within the overlap, determining that the identified object of interest is within an identified one of the two images, placing a seam between the two images so that the object of interest is within the identified image and not within the other of the two images, joining the two images at the placed seam, and rendering the two images as a single image joined at the placed seam.

In further embodiments the system processor comprises a central processing unit and an imaging chip, the imaging chip joining the two images and rendering the two images.

In further embodiments the system processor places the seam by using a cost function, the cost function including identifying regions of interest that occur near multiple seams between multiple images each from a different adjacent camera of the multiple camera system, assigning a weight to each identified region of interest, and minimizing a cost function based on a combination of the weight and a displacement of a corresponding seam.

In further embodiments placing the seam comprises drawing a seam at an initial position, determining whether the drawn seam passes through the object of interest, and using a boundary of the object of interest to move the seam to avoid the boundary.

In further embodiments the boundary is used as a constraint in a seam placement process, the system processor further identifying a second object of interest within the overlap and using a boundary of the second object of interest as a second constraint in the seam placement process.

In further embodiments the multiple camera system comprises a plurality of cameras mounted to a central support, equally spaced around the perimeter of the support and directed outwards from the center of the support to provide a panoramic field of view.

What is claimed is:

1. A method comprising:
    identifying regions of of interest within an overlap between two images each from a different adjacent camera of a multiple camera system, the overlap being an image region in which an edge of a field of view of one of the two cameras overlaps an adjacent edge of a field of view of the other of the two cameras so that the overlap is in both of the two images;
    determining that the identified regions of interest are within an identified one of the two images;
    assigning a weight to each identified region of interest;
    determining a plurality of costs, the costs being based on a combination of the weight and a displacement of the corresponding seam required to move the corresponding seam from the respective identified region of interest;

minimizing a cost function based on the determined costs to select a seam placement:
placing a seam between the two images so that the selected region of interest is within the identified image and not within the other of the two images by rotating a camera support that carries the different adjacent cameras of the multiple camera system;
joining the two images at the placed seam; and
rendering the two images as a single image joined at the placed seam.

2. The method of claim 1, wherein placing the seam comprises searching for a seam position and confining the search to the overlap.

3. The method of claim 1, wherein identifying regions of interest comprises identifying one of a face using a face identification module; text using a text identification module, or a display screen using a display screen detector module.

4. The method of claim 1, wherein identifying regions of interest comprises tracking a location of a previously identified object of interest.

5. The method of claim 1, wherein placing a seam comprises:
drawing a seam at an initial position;
determining whether the drawn seam passes through the selected region of interest; and
using a boundary of the selected region of interest to move the seam to avoid the boundary.

6. The method of claim 1, wherein the boundary is used as a constraint in a seam placement process.

7. The method of claim 6, further comprising selecting a second region of interest within the overlap and using a boundary of the second region of interest as a second constraint in minimizing the cost function.

8. The method of claim 1, wherein determining that the identified-regions of interest are within an identified one of the two images comprises determining that the identified-regions of interest are entirely within an identified one of the two images.

9. A method to minimize or reduce the regions of interest upon which a seam fails, the method comprising:
identifying regions of interest that occur near seams between images each from a different adjacent camera of a multiple camera system;
assigning a weight to each identified region of interest;
determining a plurality of costs, the costs being based on a combination of the weight and a displacement of the corresponding seam required move the corresponding seam from the respective identified region of interest;
minimizing a cost function based on the determined costs to select a seam placement;
placing seams between the two images using the minimized cost;
joining the images at the placed seams; and
rendering the images as a single image joined at the placed seams.

10. The method of claim 9, wherein the weights are assigned based on the importance to a viewer of the respective region of interest.

11. The method of claim 9, wherein the weights are assigned based on a category of an object in each respective region of interest.

12. The method of claim 9, wherein the cost function is a gradient descent.

13. The method of claim 9, wherein minimizing the cost function comprises selecting a series of displacement values and determining a cost until the cost converges.

14. The method of claim 9, wherein placing seams comprises rotating a camera support that carries the different adjacent cameras of the multiple camera system.

15. A video conference node comprising:
a system processor;
a communication interface coupled to the system processor; and
a multiple camera system coupled to the system processor, the multiple camera system capturing at least two images each from a different adjacent camera, the images having an overlap being an image region in which an edge of a field of view of one of the two cameras overlaps an adjacent edge of a field of view of the other of the two cameras so that the overlap is in both of the two images, the system processor identifying an object of interest within the overlap, determining that the identified object of interest is within an identified one of the two images, placing a seam between the two images so that the object of interest is within the identified image and not within the other of the two images by rotating a camera support that carries the different adjacent cameras of the multiple camera system, joining the two images at the placed seam, and rendering the two images as a single image joined at the placed seam,
wherein the system processor places the seam by using a cost function, the cost function including identifiying regions of interest that occur near multiple seam between multiple images each from a different adjacent camera of the multiple camera system, assigning a weight to each identified region of interest, and minimizing a cost fuction based on a combination of the weight and a displacement of a corresponding seam.

16. The video conference node of claim 15, wherein the system processor comprises a central processing unit and an imaging chip, the imaging chip joining the two images and rendering the two images.

17. The video conference node of claim 15, wherein placing the seam comprises:
drawing a seam at an initial position;
determining whether the drawn seam passes through the object of interest; and
using a bindary of the object of interest to move the seam to avoid the boundary.

18. The video conference node of claim 17, wherein the boundary is used as a constraint in a seam placement process, the system processor further identifying a second object of interest within the overlap and using a boundary of the second object of interest as a second constraint in the seam placement process.

19. The video conference node of claim 15, wherein the multiple camera system comprises a plurality of cameras mounted to a central support, equally spaced around the perimeter of the support and directed outwards from the center of the support to provide a panoramic field of view.

* * * * *